Jan. 28, 1964 A. E. BILYEU 3,119,650

DEVICE FOR PROPAGATION OF SCENT FOR ATTRACTING WILD GAME

Filed Sept. 14, 1960

INVENTOR.
ARCHIE E. BILYEU
BY
Braddock and Braddock
ATTORNEYS 3,119,650
Patented Jan. 28, 1964

3,119,650
DEVICE FOR PROPAGATION OF SCENT FOR ATTRACTING WILD GAME
Archie E. Bilyeu, Joice, Iowa, assignor to Aladdin Manufacturing Company, Minneapolis, Minn., a corporation of Minnesota
Filed Sept. 14, 1960, Ser. No. 55,893
2 Claims. (Cl. 21—117)

This application is a continuation-in-part of my application for Scent for Attracting Wild Game and Method for Its Use, Serial No. 792,825, filed February 12, 1959.

The invention herein has relation to a device for propagating into the atmosphere a scent that is attractive to wild animals. Most scents used to interest or attract animals for hunting or other purposes are not lifelike or effective unless heated to at least body temperature. When heated, the scents are readily propagated throughout the surrounding atmosphere and override any man scent that is present. Heat aids in the diffusion of the scent and permits covering a much wider area with the scent.

When hunting wild animals it is possible to transport only a small device. The invention herein discloses a device for heating and propagating a scent that is readily carried on the person and may be supported unobtrusively in the woods. The products of combustion evolved by the handwarmer used in combination with the device are substantially odor free and do not interefere with the scent that is propagated to attract the animals. When the composition used to attract the animals is heated, the scented vapor becomes, to an appreciable extent, entrained with the products of combustion of the catalytic type warmer as they rise from the warmer and this action considerably increases carrying power of the combined scent and the effective range.

It is an object of the present invention to present a device that will propagate a heated scent into the atmosphere to attract wild animals and is easily carried on a person without being cumbersome of excessively large.

Figure 1:
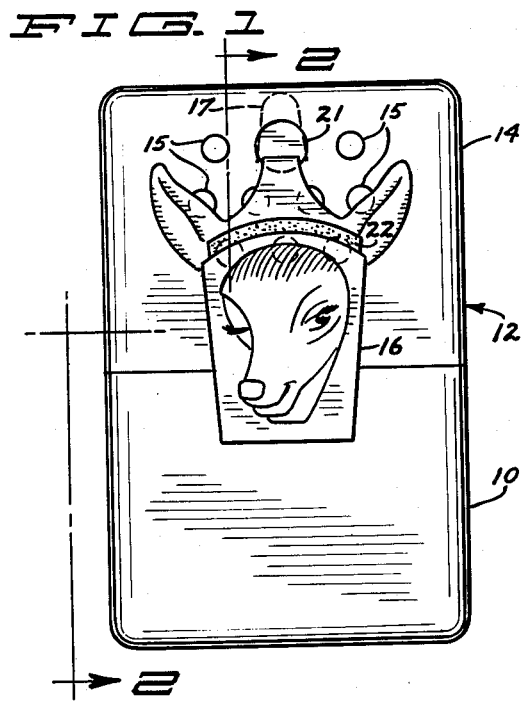
FIG. 1 is a front elevational view of a first form of a device made according to the present invention showing a method of holding a scent receiving porous material adjacent a catalytic type handwarmer.
Figure 2:
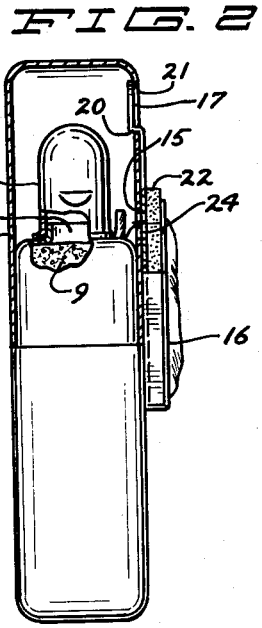
FIG. 2 is a sectional view taken as on line 2—2 in FIG. 1.
Figure 3:
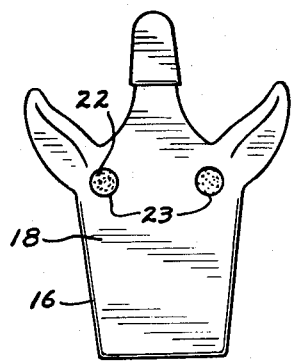
FIG. 3 is a rear elevational view of a holder of scent absorbing material showing ports for entrance of heated combustion products.

Referring to FIGS. 1 through 3 and the numerals of reference thereon, a fuel case 10 of a catalytic type warmer 12 contains porous matter 11 and fuel, as is usual in warmers of this type. A catalytic type burner 13 is positioned over the fuel case 10 as well as over a top fuel passageway 19 to said fuel case in a usual manner. A metallic burner cover 14 is provided with a plurality of holes 15 therethrough. These holes are for the purpose of admitting air to the burner 13 and for passing off the products of combustion from the burner. A catalytic type warmer is disclosed in United States Letters Patent No. 2,670,728, issued to John W. Smith on March 2, 1954.

A lure composition receptacle 16 has an outer wall shaped like a deer head and has an upwardly extending tab 17 with a bent portion 20 that will rest on an edge of a cigarette lighter hole 21 in cap 14. The tab 17 is of configuration and size to allow easy removal of the lure composition receptacle by rotating it upwardly and pulling the tab out of the hole and yet securely holds the receptacle when it is in the normal position attached to the hand warmer.

The lure receptacle 16 contains a heat resistant porous material 22 that will absorb a wild animal lure composition and uniformly disperse it throughout the material. A pair of heat transfer holes 23, 23 are located in the back wall 18 of receptacle 16 and are positioned to align with two of holes 15 in cover 14 as shown at 24 in FIG. 2. Alignment of the holes provides a passageway for heated products of combustion from burner 13 to pass directly into the porous material 22 and heat the lure composition to body temperature to effect proper aroma and diffusion of the scent.

The top of receptacle 16 is open and the porous material 22 protrudes therefrom. This allows the scent to be distributed more rapidly. The heated air flowing into the receptacle through holes 15 and aligning holes 23 will naturally rise upward through the porous material and the open top will aid in this normal flow of heated air. Diffusion of the scent is thereby aided. Also, the lure composition will be applied to the porous material through the open top of the receptacle 16.

As best seen in FIG. 2, the back wall 18 of the receptacle 16 is in contacting relationship to the outer surface of burner cover 14. This insures that the heat generated within the burner will also be transmitted to the receptacle 16 by conduction.

Figure 4:
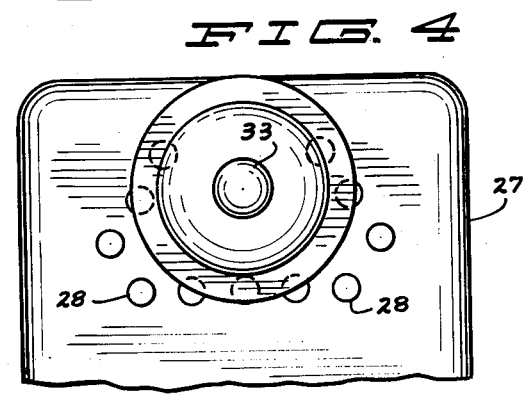
FIG. 4 is a partial front elevational view of a second form of the present invention showing a device for holding a scent receiving material adjacent a catalytic type hand warmer.
Figure 5:
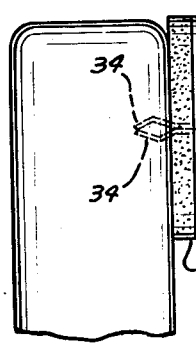
FIG. 5 is a partial side elevational view of the device of FIG. 4.

A second form of the invention is shown in FIGS. 4 and 5. In this form a heater cover 27 of a catalytic type warmer as described in connection with the previous form of the invention is provided with a plurality of holes 28 therethrough. As previously suggested these holes are for the purpose of admitting air to the burner (not shown) and for passing off products of combustion from the burner.

A lure composition receiving device 29 consists of a plate 30 and a heat resistant porous material 31. A retaining clip 32 extends through the plate 30 and the material 31 and has a head 33 in contact with an outside surface of said plate, and a pair of diverging fastener legs 34, 34. These fastener legs 34, 34 are designed to pass through one of the holes 28 to retain the porous material 31 of the device 29 in contiguous relation to an outer surface of the metallic burner cover 27 through one of the holes 28 therein and adjacent other holes 28.

In using either form of the invention disclosed herein, wild animal lure composition is deposited on the porous material of that form of the invention. Preferably the porous material will be removed from the cover, although the lure composition may be added with the receptacle in place on the warmer. The porosity of the absorbing material will tend to cause the lure composition to permeate relatively evenly throughout said material.

With the porous material containing the lure composition in place on the warmer cover, the burner of the warmer will be put into operation and the cover put in place. After the parts are so positioned, the heat from the burner will permeate through the burner cover and into the porous material to cause the wild animal lure composition to be heated and volatilized and driven off both directly into the atmosphere around the edges of the material and back into the burner cover through the provided holes. In either case, the scent thus driven off will tend to become air borne with the products of combustion from the burner and will be carried out to tend to lure animals toward the source of the scent.

As disclosed, the device presents an easily carried lure to aid hunters and other people in attracting wild animals. While maximum heat and lure scent output will be obtained when devices of the invention are operated as set out above, it is to be understood that the warmer-receptacle combination will in many instances be enclosed in a porous bag to somewhat limit access of air to the burner and to thereby control the heat and scent output to protect the hunter against burns and, by reducing the rate of scent propagation, to prolong the period of effective propagation per charge of wild animal lure composition to the porous material.

What is claimed is:

1. The combination with a catalytic type warmer having a fuel chamber full of porous matter, a burner spaced from and adjacent said fuel chamber in heat transmitting, fuel vapor receiving relation thereto, said burner including a catalytic agent for promoting non-flaming combustion of fuel from said chamber and a cover surrounding said burner and having a plurality of holes defined therein for air entrance and heated combustion product egress to and from said burner, of: an open top receptacle having an integral support tab removably engaging one of said holes in said cover, said receptacle having an inner wall next adjacent said cover provided with at least one hole therethrough positioned to align with one of said holes in said cover to thereby provide a passageway for heated combustion products to the interior of said receptacle, and a porous animal lure scent composition receiving material substantially filling said receptacle.

2. The combination as specified in claim 1 wherein said tab has an intermediate portion bent at substantially right angles to the plane of the tab so that when said receptacle is supported contiguous to the outer surface of said heater cover an upper portion of said tab is on an opposite side of said cover from said receptacle and said bent portion is supported on edge surfaces of one of said holes through said cover.

References Cited in the file of this patent

UNITED STATES PATENTS

| 1,477,273 | Liss | Dec. 11, 1923 |
|---|---|---|
| 1,988,617 | Adams | Jan. 22, 1935 |
| 2,434,825 | Williams et al. | Jan. 20, 1948 |
| 2,670,728 | Smith | Mar. 2, 1954 |
| 2,721,099 | Rupp | Oct. 18, 1955 |
| 2,959,354 | Beck | Nov. 8, 1960 |
| 2,961,724 | Alling | Nov. 29, 1960 |

FOREIGN PATENTS

| 986,269 | France | Mar. 21, 1951 |